United States Patent
Sutton et al.

(10) Patent No.: US 11,927,172 B2
(45) Date of Patent: Mar. 12, 2024

(54) METHOD OF FORMING A WIND TURBINE BLADE

(71) Applicant: Vestas Wind Systems A/S, Aarhus N. (DK)

(72) Inventors: Chris Sutton, Hampshire (GB); Paul Lewis, Newport (GB); James Olive, Whitwell (GB); Steven Pascoe, Cowes (GB); Ashleigh Porter, Newport (GB)

(73) Assignee: Vestas Wind Systems A/S, Aarhus N. (DK)

( * ) Notice: Subject to any disclaimer, the term of this patent is extended or adjusted under 35 U.S.C. 154(b) by 146 days.

(21) Appl. No.: 17/605,090

(22) PCT Filed: Apr. 22, 2020

(86) PCT No.: PCT/DK2020/050106
§ 371 (c)(1),
(2) Date: Oct. 20, 2021

(87) PCT Pub. No.: WO2020/216422
PCT Pub. Date: Oct. 29, 2020

(65) Prior Publication Data
US 2022/0213867 A1  Jul. 7, 2022

(30) Foreign Application Priority Data
Apr. 23, 2019 (DK) .............. PA 2019 70247

(51) Int. Cl.
*B29C 65/00* (2006.01)
*B29C 65/48* (2006.01)
(Continued)

(52) U.S. Cl.
CPC ............ *F03D 1/0675* (2013.01); *B29C 65/48* (2013.01); *B29C 65/7802* (2013.01);
(Continued)

(58) Field of Classification Search
CPC ..... F03D 1/0675; F03D 1/0683; B29C 65/48; B29C 65/7802; B29C 65/7841
See application file for complete search history.

(56) References Cited

U.S. PATENT DOCUMENTS

| 3,305,420 A | 2/1967 | Brownlee |
| 3,376,184 A | 4/1968 | Ritchey |

(Continued)

FOREIGN PATENT DOCUMENTS

| EP | 2667019 A2 | 11/2013 |
| EP | 2735731 A1 | 5/2014 |

(Continued)

OTHER PUBLICATIONS

English translation of JP-2013121683 by PE2E Jun. 13, 2023.*
(Continued)

*Primary Examiner* — Deming Wan

(57) ABSTRACT

The invention provides a method of forming a wind turbine blade. The blade has a main blade module that defines a main body of the blade and includes a first mating feature, e.g. a tongue. The blade also includes a separate edge module that defines at least part of a trailing edge of the blade and includes a second mating feature, e.g. a recess. The method includes applying an adhesive to at least one of the first mating feature and the second mating feature. The method includes arranging the separate edge module relative to the main blade module such that the first and second mating features are mutually adjacent. The method includes applying a pressure force to squeeze the adhesive to bond the first and second mating features together. The pressure force is caused by removing air from, or injecting air into, an air sealed region.

17 Claims, 11 Drawing Sheets

(51) Int. Cl.
  *B29C 65/78* (2006.01)
  *F03D 1/06* (2006.01)
  *B29L 31/08* (2006.01)

(52) U.S. Cl.
  CPC .... *B29C 65/7841* (2013.01); *B29C 66/12443* (2013.01); *B29C 66/342* (2013.01); *B29C 66/81455* (2013.01); *B29L 2031/085* (2013.01); *F05B 2240/304* (2020.08)

(56) References Cited

U.S. PATENT DOCUMENTS

| | | |
|---|---|---|
| 2011/0030183 A1 | 2/2011 | Livingston et al. |
| 2011/0142668 A1 | 6/2011 | Rao |
| 2012/0107128 A1 | 5/2012 | Kontis et al. |
| 2013/0309096 A1 | 11/2013 | Le Bras et al. |
| 2013/0323070 A1 | 12/2013 | Grabau |
| 2016/0348642 A1 | 12/2016 | Hayden et al. |
| 2018/0266389 A1 | 9/2018 | Engelhardt et al. |

FOREIGN PATENT DOCUMENTS

| | | | | |
|---|---|---|---|---|
| EP | 3015701 A1 | | 5/2016 | |
| EP | 3091225 A1 | * | 11/2016 | ............ F03D 1/0633 |
| JP | 2013121683 A | * | 6/2013 | ............. B29C 43/10 |
| WO | 2014086564 A1 | | 6/2014 | |
| WO | WO-2015082813 A1 | * | 6/2015 | ............. B29C 65/48 |
| WO | 2017042193 A1 | | 3/2017 | |

OTHER PUBLICATIONS

English EP-3091225 by PE2E, Nov. 2, 2023.*
English WO20150828 by PE2E, Nov. 2, 2023.*
Danish Patent and Trademark Office, Search and Examination Rejport in PA 2019 70247, dated Oct. 25, 2019.
European Patent Office, International Search Report and Written Opinion in PCT Application No. PCT/DK2020/050106, dated Jul. 3, 2020.

* cited by examiner

METHOD OF FORMING A WIND TURBINE BLADE

TECHNICAL FIELD

The present invention relates generally to a method of forming a wind turbine blade and, in particular, to a method of forming a wind turbine blade comprising a main blade module and a separate edge module such as a pre-manufactured trailing edge.

BACKGROUND

In modern wind turbines, the provision of serrations along the trailing edge of the rotor blades is a commonly-used technique for reducing noise from the blades. In particular, such serrations act to reduce the noise generated at the turbulent trailing edge boundary layer while minimising any reduction in aerodynamic efficiency of the blades.

It is known to provide a separate part including serrations which is retrofitted to a wind turbine blade. Often, the separate part is attached at the trailing edge of the blade, typically by bonding it to the pressure side of the blade, so that the serrations extend outward from the trailing edge. Despite efforts to minimise the thickness of such separate serrated trailing edge parts, attaching such separate parts in this way can lead to a step at the point where the separate part attaches to the surface of the rotor blade, in particular where the edge of the separate part attaches to the surface of the rotor blade. Such a step can create turbulence and noise.

In order to address these issues, it has been proposed to manufacture a wind turbine blade that includes serrations at the trailing edge, thus obviating the need to retrofit a separate part. In particular, it has been proposed to provide a rotor blade formed of two parts: a main blade part or module that forms the majority of the aerodynamic profile of the blade; and, a separate edge part or module including serrations at the trailing edge.

Joining the main blade and separate edge modules together during the manufacturing process can pose difficulties. For example, moving the main blade and separate edge modules to bring them together can be challenging because of, for example, the scale of the parts, the complex or asymmetric geometry of the parts, and the fact that the parts are formed from delicate materials. Furthermore, the parts need to be joined together in such a way that there is a smooth transition, i.e. no step, at the surface of the rotor blade to avoid the generation of noise or turbulence at this transition point.

It is against this background to which the present invention is set.

SUMMARY OF THE INVENTION

According to an aspect of the invention there is provided a method of forming a wind turbine blade. The wind turbine blade comprises a main blade module defining a main body of the blade and including a first mating feature. The wind turbine blade comprises a separate edge module defining at least part of a trailing edge of the blade and including a second mating feature. The method comprises applying an adhesive to at least one of the first mating feature and the second mating feature. The method also comprises arranging the separate edge module relative to the main blade module such that the first and second mating features are mutually adjacent. The method also comprises applying a pressure force to squeeze the adhesive to bond the first and second mating features together. The pressure force is caused by removing air from, or injecting air into, an air sealed region.

The method may comprise locating a pressure distributor against the separate edge module to distribute the pressure force that is applied to the first and second mating features.

The method may comprise providing a consolidator at an interface between the main blade module and the separate edge module at an outer surface of the blade. The consolidator may be arranged to ensure that the separate edge module is flush with the main blade module at the interface when the pressure force is applied.

The first mating feature may be a tongue and the second mating feature may be a recess complementary to the tongue. Arranging the separate edge module relative to the main blade module may include receiving the tongue into the recess.

The separate edge module may comprise at least one vent hole extending between the recess and an outer surface of the separate edge module, and wherein squeezing the adhesive causes the adhesive to flow through the at least one vent hole.

Arranging the separate edge module relative to the main blade module may comprise: positioning the main blade module so that the tongue extends in a generally upwards direction; and, placing the separate edge module on the main blade module, wherein the tongue and the recess are shaped so that the separate edge module self-locates relative to the main blade module when placed thereon. The main blade module may be positioned in a cradle, guide or gauge, which may be shaped to verify the profile of the completed blade.

The air sealed region may encapsulate at least the first and second mating features. The method may comprise forming the air sealed region after the separate edge module has been arranged relative to the main body module, and the method may comprise removing air from the sealed region to create a vacuum and cause the pressure force to be applied. In this way the mating features are compressed, and therefore bonded, together.

The air sealed region may be defined by a deformable vacuum bag.

The method may comprise providing an end of the separate edge module that defines the at least part of the trailing edge with a protective cover prior to forming the air sealed region. Advantageously, this guards against damage being caused to the trailing edge, or a trailing edge feature such as serrations, when the vacuum is created and the vacuum bag is compressed against the separate edge module.

The air sealed region may be defined by one or more inflatable airbags, also referred to as bonding airbags. The method may comprise injecting air into the one or more inflatable airbags to cause the force to be applied by the inflatable airbags applying pressure to an outer surface of the blade in the vicinity of the first and second mating features.

The pressure force applied to the outer surface may be applied progressively in a chordwise direction of the blade towards the trailing edge of the blade. For example, the pressure force may be applied progressively from an open end of the recess to a closed end of the recess. This may be achieved by the provision of a row or series of bonding airbags adjacent to the blade outer surface that are pressurised sequentially or progressively in a direction towards the closed end of the recess.

The method may comprise injecting the one or more inflatable airbags with air at a temperature greater than ambient temperature.

Arranging the separate edge module relative to the main blade module may comprise positioning the main blade module so that the first mating feature extends in a generally upwards direction. The arranging step may comprise clamping the separate edge module in a clamp. The clamp may comprise inflatable airbag clamps, wherein clamping the separate edge module comprises injecting air into the air sealed inflatable airbag clamps. The arranging step may comprise positioning the clamped separate edge module generally above the main blade module. The arranging step may comprise lowering the separate edge module onto the main blade module and using an alignment device to maintain alignment between the main blade module and the separate edge module when arranging the first and second mating features to be mutually adjacent, the alignment device being coupled to the clamp, for example by a frame.

The alignment device may comprise a plurality of alignment rollers that roll against an outer surface of the main blade module as the separate edge module is lowered to maintain alignment of the separate edge module with the main blade module.

According to another aspect of the invention there is provided a wind turbine blade. The blade comprises a main blade module defining a main body of the blade and including a first mating feature. The blade comprises at least one separate edge module defining at least part of a trailing edge of the blade and each including a second mating feature. The wind turbine blade is formed according to the method described above.

BRIEF DESCRIPTION OF THE DRAWINGS

Examples of the invention will now be described by way of example with reference to the accompanying drawings, in which:

FIG. 4 shows schematic views of a frame having inflatable airbags and rollers for arranging and bonding together the main blade module and separate edge module of FIG. 2(b): in particular.

FIG. 6(a) shows the main blade module and the separate edge module arranged to be mutually adjacent, and the airbag in a deflated state, FIG. 6(b) shows the airbag in a partially inflated state so that a pressure force is applied to the separate edge module at an end opposite to the trailing edge, and FIG. 6(c) shows the airbag in a fully inflated state in which the pressure force is applied to a greater amount of the separate edge module;

DETAILED DESCRIPTION

Figure 1:
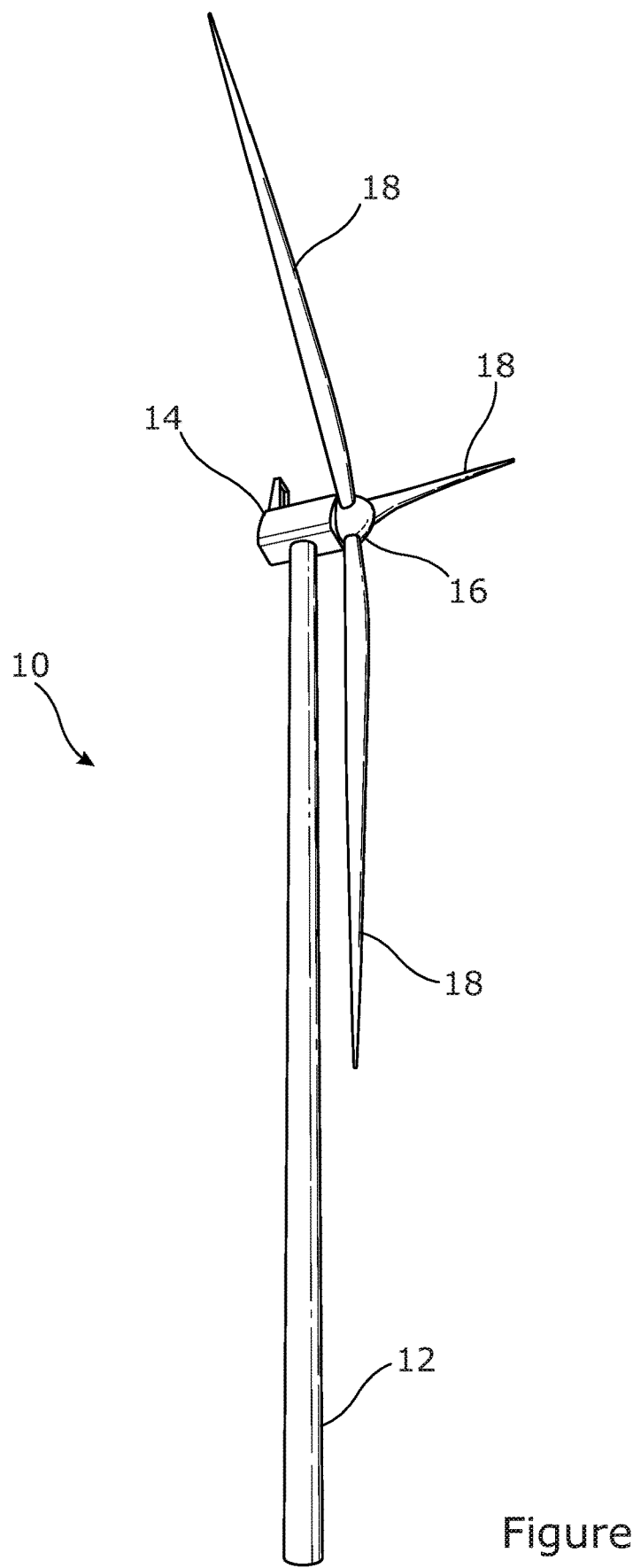
FIG. 1 is a schematic view of a wind turbine having a plurality of wind turbine blades formed according to the invention.

FIG. 1 shows a wind turbine wind turbine (10). The wind turbine 10 includes a tower 12, a nacelle 14 rotatably coupled to the top of the tower 12, a rotor including a rotor hub 16 mounted to the nacelle 14, and a plurality of wind turbine rotor blades 18 and which are coupled to the rotor hub 16. The rotor 16 comprises three blades 18, but in other examples the rotor 16 may have any suitable number of blades 18. The nacelle 14 and rotor blades 18 are turned and directed into the wind direction by a yaw system. The nacelle 14 houses generating components (not shown) of the wind turbine 10, including the generator, gearbox, drivetrain and brake assembly, as well as convertor equipment for converting the kinetic energy of the wind into electrical energy for provision to the grid. The wind turbine 10 is shown in its fully-installed form suitable for operation; in particular, the rotor 16 is mounted on the nacelle 14 and each of the blades 18 are mounted on the rotor and rotor hub 16.

Figure 2A:
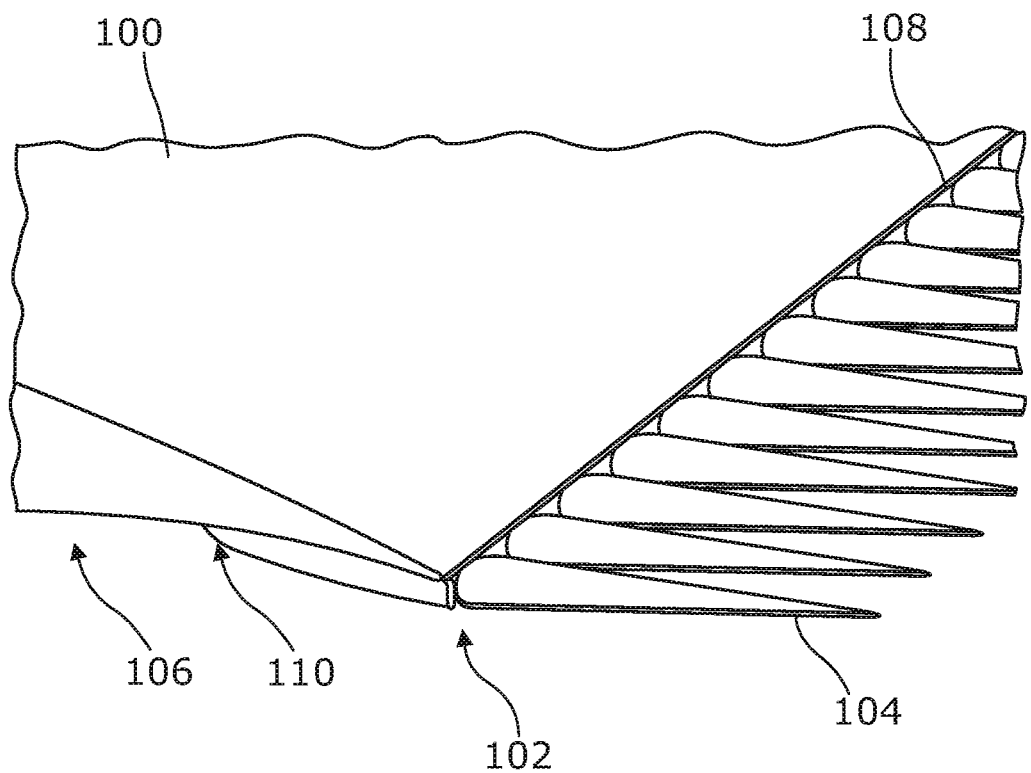
FIG. 2(a) is a schematic view of a prior art wind turbine blade arrangement having a serrated trailing edge piece attached at a trailing edge of a wind turbine blade.

FIG. 2(a) shows part of a prior art wind turbine rotor blade 100 having attached thereto a separate part 102 including a plurality of serrations 104. In particular, the separate part 102 is bonded to the blade 100 at a pressure side 106 of the trailing edge 108 of the blade 100, so that the serrations 104 extend outwards, i.e. downstream, from the trailing edge 108. It is noted that a step 110 is formed at the transition between the pressure-side surface 106 of the blade 100 and the separate part 102. This step change in thickness causes noise and/or turbulence.

Figure 2B:
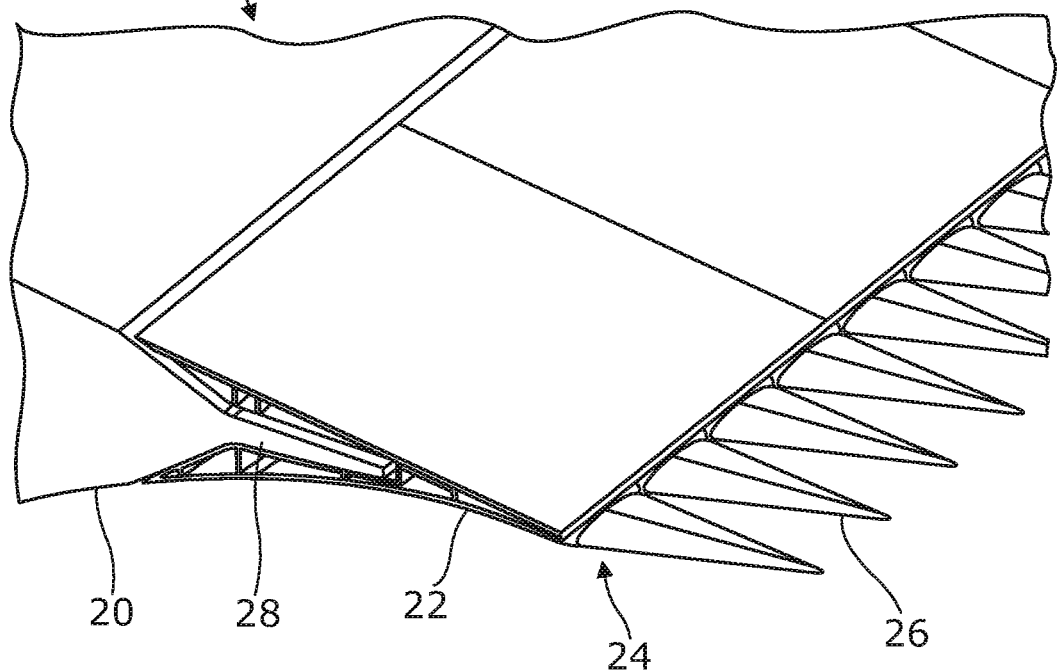
FIG. 2(b) is a schematic view of a part of the wind turbine blade of FIG. 1 and having a separate edge module mounted to a main blade module.

FIG. 2(b) shows a part of one of the rotor blades 18 of the wind turbine 10. The blade 18 is formed by a plurality of parts or modules that are manufactured separately and then joined together. In particular, the blade 18 is formed by one or more main blade modules 20 and a plurality of separate edge modules 22. The one or more main blade modules 20 form the majority of the aerofoil shape or profile of the blade 18 and define a leading edge (not shown) of the blade 18. The edge modules 22 are premanufactured modules, i.e. they are made separately from the main blade module 20, and attached to the main blade module 20 to form the wind turbine blade 18. Each of the separate edge modules 22 define part of a trailing edge 24 of the blade 18, and the separate edge modules 22 are connected or arranged end-to-end along the main blade module 20 to define the trailing edge 24. In particular, the separate edge modules 22 may be connected or clicked together prior to joining the main blade module 20. Hence each edge module 22 may be referred to as a premanufactured trailing edge (PMTE) module. For example, each of the separate edge modules 22 may be approximately 250 mm in length (in a spanwise direction of the blade). The separate edge modules 22 may be non-identical to conform to the profile of the blade 18. In the described example, the separate edge modules 22 each include a plurality of serrations 26 at the trailing edge end.

The main blade module 20 is preferably formed from composite materials, for example fibre-reinforced plastic such as glass-fibre reinforced plastic (GFRP). The main blade module 20 may be formed using any suitable technique known for forming wind turbine blade shells, e.g. vacuum-assisted resin transfer moulding (VARTM). The edge module 22 may also be formed from composite materials, e.g. GFRP or just plastic, and may be a moulded part. This may also be formed by VARTM, injection moulding or other suitable technique. Alternatively, the edge module 22 could be made from an elastomeric material, such as rubber.

Figure 3:
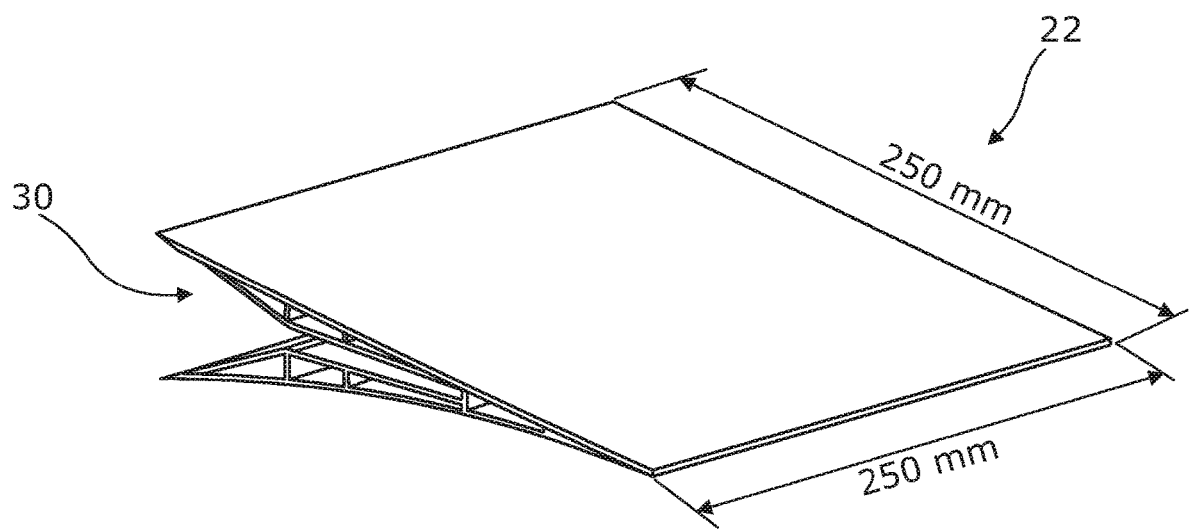
FIG. 3 shows a schematic view of the separate edge module of FIG. 2(b)

With continued reference to FIG. 2(b), and additional reference to FIG. 3—which shows the edge module 22 without the serrations—the main blade and separate edge modules 20, 22 include respective complementary mating features 28, 30 for joining the modules 20, 22 together. In particular, the mating feature of the main blade module 20 is in the form of a tongue 28, and the mating feature of the separate edge module 22 is in the form of a recess 30 (as shown in FIG. 3) arranged to receive the tongue 28. The recess 30 of the edge module 22 is at, and faces, an end of the edge module 22 opposite to an end that defines the trailing edge 24 of the blade 18.

Methods of bringing together and bonding the main blade and separate edge modules 20, 22 will now be described.

Figures 4A, 4B:
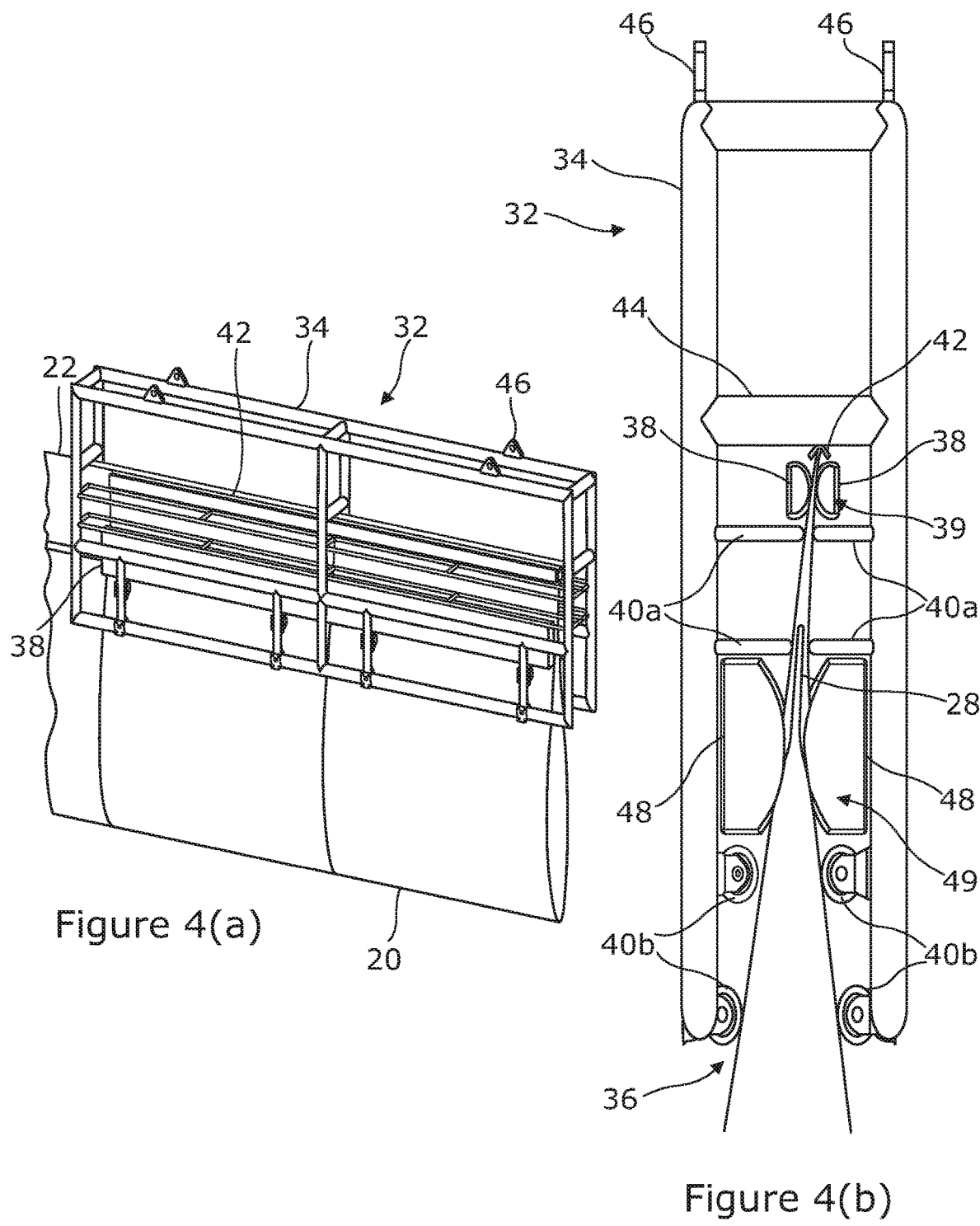
FIGS. 4(a) and 4(b) show perspective and sectional views of the frame, respectively.

FIGS. 4(a) and 4(b) show schematic perspective and sectional views of an apparatus or arrangement 32 for forming the wind turbine blade 10 from the main blade and separate edge modules 20, 22. The arrangement 32 includes a jig or frame 34 with frame bars defining a cuboid frame shape that is open at a lower side 36 so as to receive the modules 20, 22 therein.

The arrangement 32 includes a clamping mechanism or arrangement, or simply a clamp, for gripping and moving the separate edge modules 22. In particular, the clamp includes at least one pair of clamping airbags or bladders 38 attached to the frame 34 and facing each other, and between which the edge module 22 is received. The clamping airbags 38 define an air sealed region 39 and may be inflated by injecting air into the sealed region 39. This causes the clamping airbags 38 to apply a pressure force to both sides of the edge module 22 to grip or clamp the edge module in place relative to the frame 34. This allows the edge module 22 to be moved via movement of the frame 34. In particular, lifting and moving the separate edge module 22 using the inflatable and flexible clamping airbags 38 reduces the risk of the separate edge modules 22 being crushed or otherwise damaged during this process. The use of airbags also allows the jig 32 to lift and move edge modules 22 that have different geometries.

The arrangement 32 includes an alignment device or arrangement for maintaining the relative positions of the main blade and separate edge modules 20, 22 when they are being brought together and/or bonded together. In particular, the alignment device in the described example is in the form of pairs of rollers or wheels 40a, 40b attached to the frame 34, and between which the main blade and separate edge modules 22 are received. Specifically, two pairs of the rollers 40a are located and spaced apart to receive the edge module 22 therethrough so that the rollers 40a contact the edge module 22 when it is received therethrough. Similarly, two more pairs of the rollers 40b are located lower in the frame 34 and spaced apart to receive the main blade module 20 therethrough so that the rollers 40b contact the main blade module 20 when it is received therethrough. The rollers 40a, 40b provide a flexible means for ensuring alignment of the modules 20, 22 that also guards against damage being caused to the modules 20, 22.

The apparatus 32 also has an angled receptor 42 attached to a horizontal bar 44 internal to the frame 34 which is arranged to receive, and maintain the position of, the end of the edge module 22 that defines the trailing edge 24 of the blade 18.

The apparatus 32 also includes pairs of clips 46 along an upper end of the frame 34. These allow the apparatus 32 to be connected to a hoist, for example, so as to move the apparatus 32 with clamped edge module 22 into position relative to the main blade module 20, where the edge module 22 may be lowered onto the main blade module 20, as described below.

The apparatus 32 also includes at least one pair of bonding airbags or bladders 48 attached to the frame 34 and facing each other, and located adjacent to the tongue 28 and recess 30 when the main blade and separate edge modules 20, 22 are brought together. The bonding airbags 48 define an air sealed region 49 and may be inflated by injecting air into the sealed region 49. This causes the bonding airbags 48 to apply a pressure force to both sides of the modules 20, 22 to bond them together, as described in greater detail below.

Figure 5A:
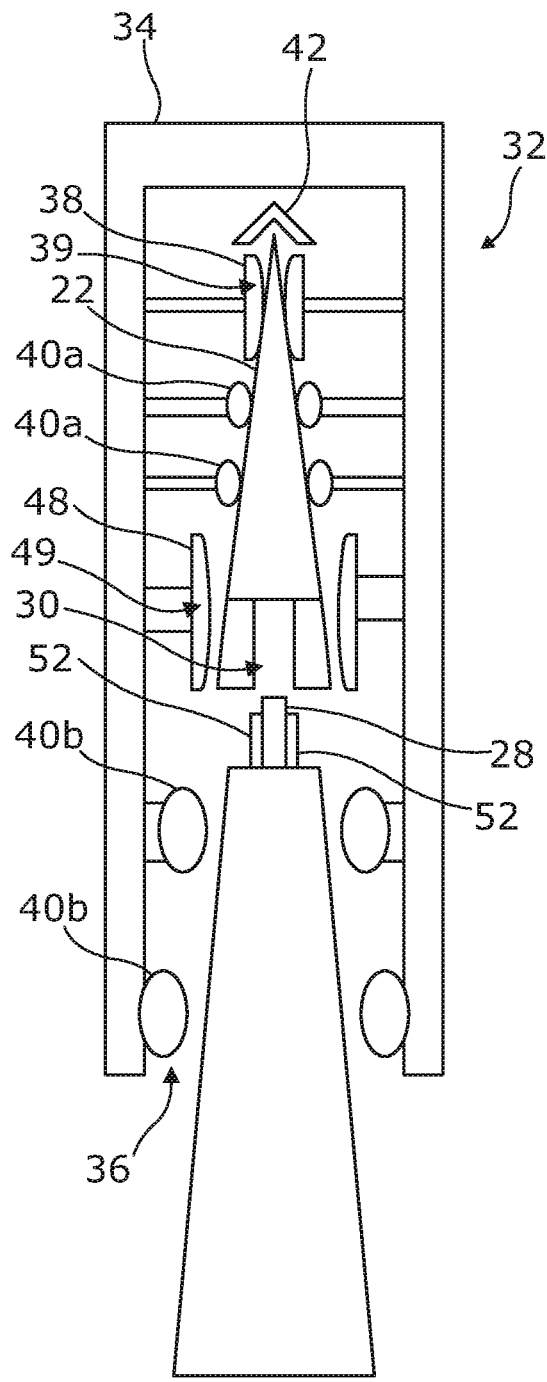
FIG. 5(a) is a schematic view of the frame of FIG. 4 in which the separate edge module is clamped by the frame and positioned above the main blade module.
Figure 5B:
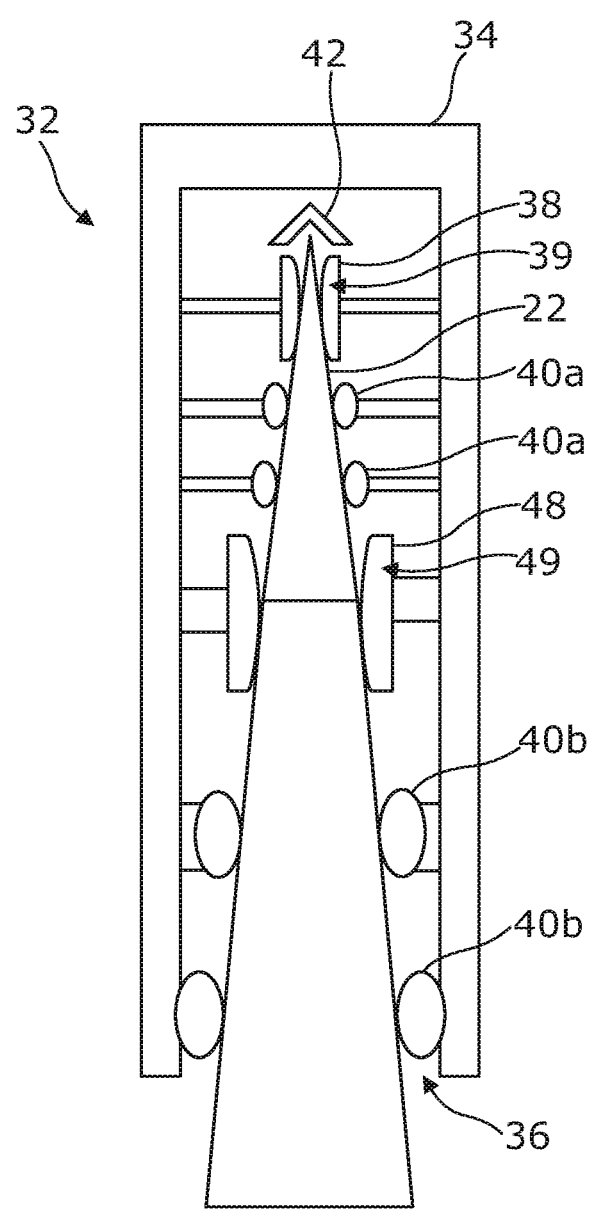
FIG. 5(b) shows the frame and separate edge module lowered onto the main blade module.

With reference to FIGS. 5(a) and 5(b), a method of forming the wind turbine blade 10 is now described. FIG. 5(a) shows in schematic form the main blade module 20 arranged or positioned such that the end of the blade having the tongue 28 extends in a generally upwards direction. The main blade module 20 may be held or supported in a structure for maintaining this orientation.

A layer of adhesive 52, for example an adhesive resin, is applied to a surface of the tongue 28, which will act to bond the tongue 28 and recess 30 together when the main blade and separate edge modules 20, 22 are brought together. In addition, or alternatively, the adhesive may be applied to a surface of the recess 30.

The apparatus 32 is used to securely clamp or grab the separate edge module 22. In particular, the edge module 22 is received into the apparatus so that the trailing edge 24 is received into the angled receptor 42 so as to guard against bending of the trailing edge 24. The rollers 40a roll against the surface of the edge module 22 as it is received into the apparatus so as to maintain the position and orientation of the edge module 22. When the edge module 22 is received into the apparatus 32 the clamp airbags 38 are in a deflated state. Once the edge module 22 is in position it is clamped in place by inflating the clamp airbags 38 so that a pressure force is applied by the airbags 38 on either side of the edge module 22.

The apparatus 32 is then moved, for example by a hoist connected to the clips or hooks 46, to position the edge module 22 generally above the main blade module 20, with the recess 30 of the edge module 22 extending generally downwards towards the tongue 28 of the main blade module 20. Of course, the adhesive layer may instead be applied at this point instead of prior to the edge module 22 being clamped and moved into position.

The apparatus 32 is then lowered from the position generally shown in FIG. 5(a) to the position generally shown in FIG. 5(b). In particular, the edge module 22 is lowered onto the main blade module 20 such that the tongue 28 and recess 30 fit together and are mutually adjacent. As the apparatus 32 is lowered, the rollers 40b contact, and roll relative to, the surface of the main blade module 20 to maintain alignment between the main blade module 20 and the separate edge module 22.

The main blade and separate edge modules 20, 22 are then bonded together by injecting air into the bonding airbags 48 which forces the tongue 28 and recess 30 together and bonds them by means of the adhesive. This is described in greater detail with reference to FIGS. 6(*a*), 6(*b*) and 6(*c*).

Figure 6A:
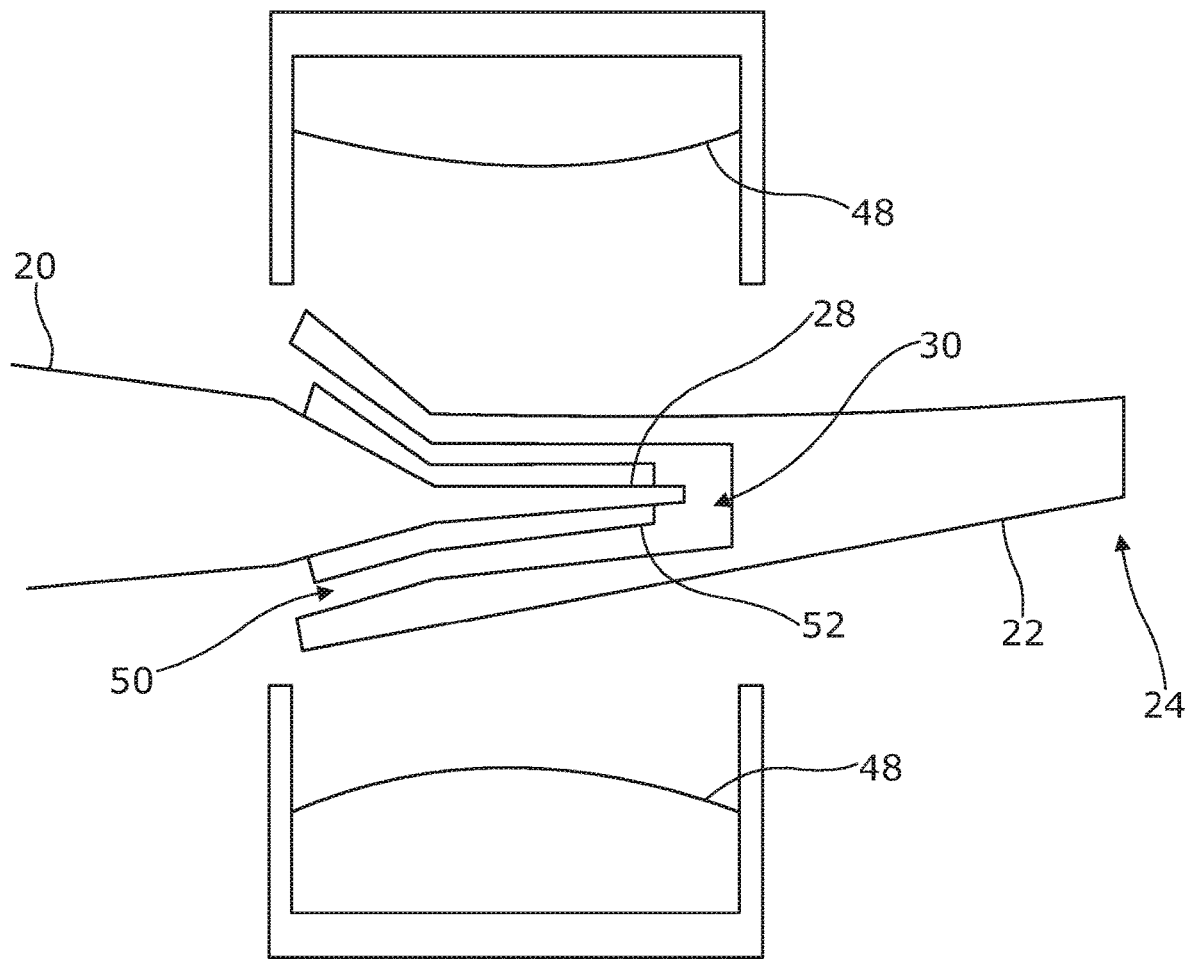
FIGS. 6(a)-(c) show partial sectional views of the main blade module, separate edge module, and inflatable airbags of FIG. 4: in particular.
Figure 6B:
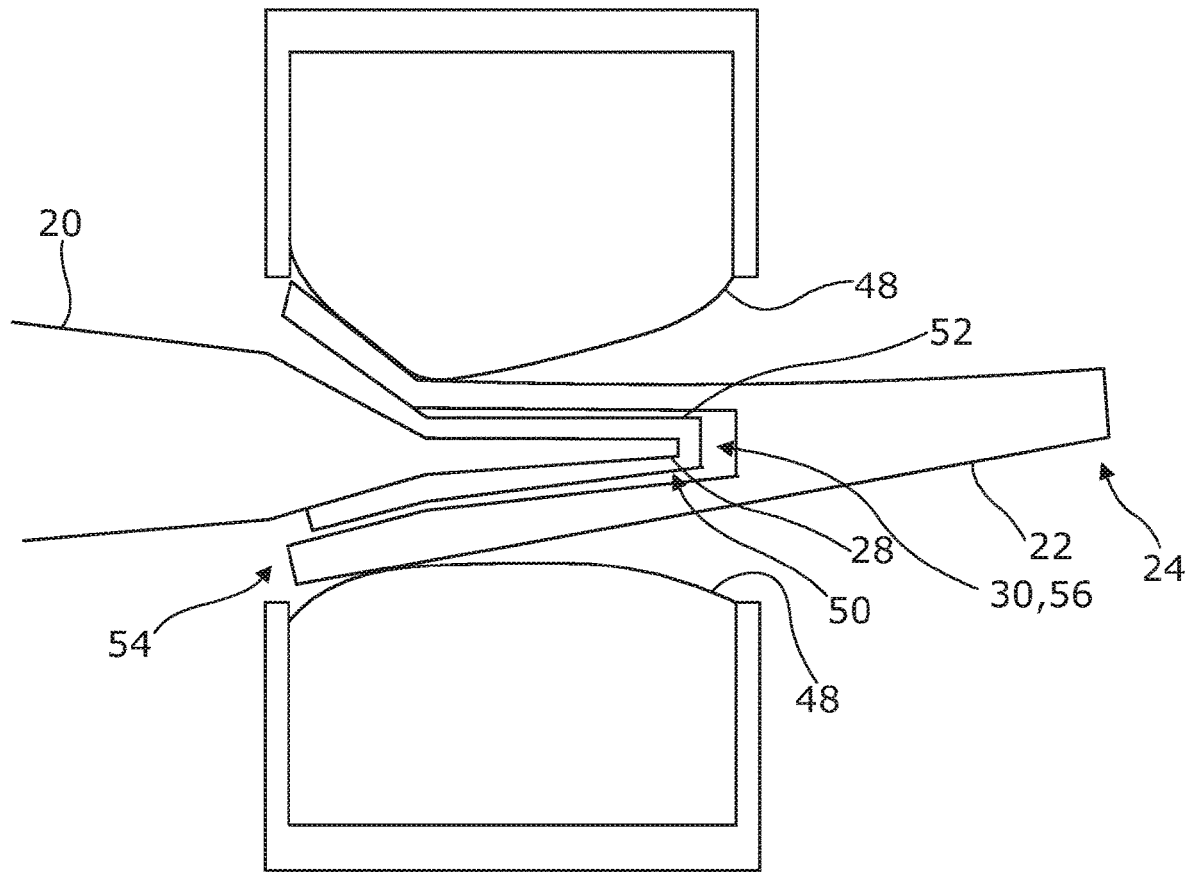
Figure 6C:
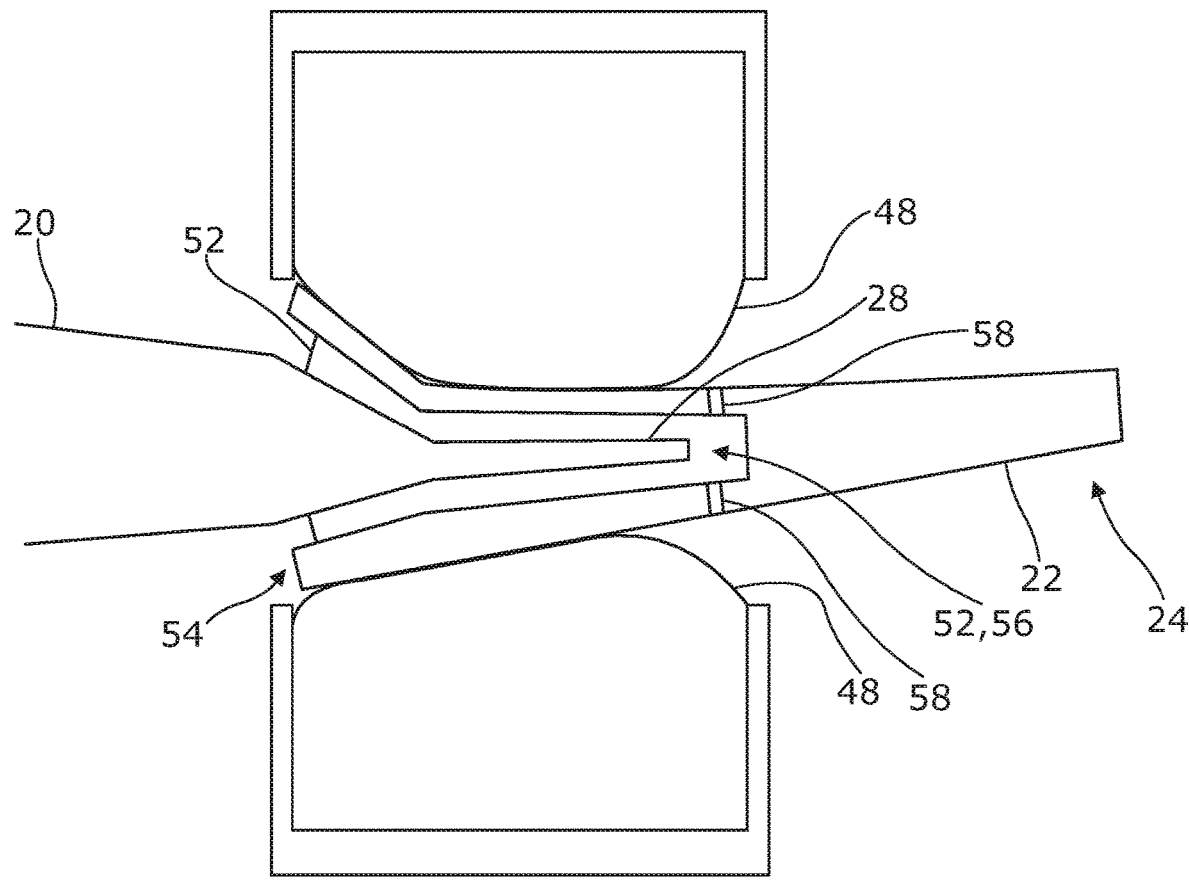

FIG. 6(*a*) shows a schematic sectional view of the tongue 28 and recess 30 when they have been brought together to be mutually adjacent by means of the apparatus 32 so that the bonding airbags 48 are adjacent thereto. The bonding airbags 48 are in a deflated state such that they do not apply a pressure force to the main blade or separate edge modules 20, 22. FIG. 6(*a*) shows that there is a gap 50 defined between the tongue 28 and recess 30 and that the tongue 28 has a layer of adhesive 52 applied to it.

FIG. 6(*b*) shows the bonding airbags 48 in a partially inflated state. In particular, the bonding airbags 48 are inflated in a manner such that the airbags 48 contact, and apply a pressure force at an open end 54 of the recess 30 of the edge module 22 opposite to a closed end 56 of the recess 30, as shown in FIG. 6(*b*). This forces the open end 54 of the recess 30 of the edge module 22 towards the tongue 28 and to squeeze the adhesive 52 between them. Specifically, by applying the pressure force at the recess open end 54 in the first instance the adhesive 52 is squeezed further into the recess 30 towards the closed end 56. At this stage, the closed end 56 of the recess (also referred to as a glue or adhesive chamber 56) starts to fill up with the adhesive 52. The pressure force is then applied progressively from the open end 54 to the closed end of the recess 30 by sequential inflation of a series of the airbags 48 from the open end 54 towards the closed end 56 Expressed differently, the pressure force is spread out in a chordwise direction of the blade 18 in a direction towards the trailing edge 24 of the blade. Advantageously, such progressive application of the pressure force causes the flow of adhesive 52 to be in a direction into the recess 30 towards its closed end 56 and therefore both prevents the adhesive 52 flowing out of the open end 54 of the recess 30 (which can cause a step at the blade surface) and facilitates complete filling of the gap 50 between the tongue 28 and recess 30, thereby improving the quality of the bond. In addition, application of the force in this sequential or progressive manner may prevent the formation of undesirable air cavities in the bond.

FIG. 6(*c*) shows the bonding airbags 48 in a fully inflated state, in which the airbags 48 apply a pressure force all the way along the surface of the edge module 22 in the vicinity of the recess (not labelled in FIG. 6(*c*)), i.e. all the way from the recess open end 54 to the recess closed end 56 of the recess 30. This forces the gap (not labelled in FIG. 6(*c*)) between the tongue 28 and recess 30 to be closed, and the main blade and separate edge modules 20, 22 to be bonded all the way along the tongue 28 and recess 30 from the open end 54 to the closed end 56. The adhesive 52 is squeezed further into the recess 30 until the adhesive chamber 56 is completely full. The edge module 22 may include one or more vent holes 58 that extend from the closed end 56 of the recess 30 to the outer surface of the edge module 22. Once the closed end 56 is filled with the adhesive 52, continued application of the pressure force causes the adhesive 52 to flow through the vent holes 58. Once the adhesive 52 reaches the surface of the edge module 22, and the adhesive 52 has cured to a sufficient degree to maintain a bond between the main blade and separate edge modules 20, 22, the bonding process is complete and inflation of the airbags 48 may be stopped, or deflation of the airbags 48 may be permitted. The provision of the vent hole(s) 58 is a relatively simple way to determine when the adhesive has completely filled a gap between the mating features 28, 30. Any adhesive 52 that exits the vent holes 58 at the surface of the blade 18 may easily be removed to ensure the rotor blade surface remains smooth. This may be achieved by, for example, abrading the cured adhesive 52 away from the surface of the blade 18.

The bonding airbags 48 may include a number of embedded heating elements (not shown) at or near a surface of the airbags 48 that contacts the separate edge module 22. Such heating elements would increase the temperature at which the bonding process between the main blade and separate edge modules 20, 22 takes place, which can reduce the time taken for the bond to cure. Alternatively, instead of using embedded heating elements, the bonding airbags 48 may be injected with heated air which would also increase the temperature at which the bonding process takes place, thereby reducing the cure time between the main blade and separate edge modules 20, 22.

The bonding airbags 48 have a flexible surface and so application of the force by the airbags 48 to the surface of the blade 18 is less likely to cause damage to the blade 18 than application of a force by a solid part. Application of a force using such a method requires relatively little effort and manpower.

FIGS. 7(*a*) and 7(*b*) show perspective views of the wind turbine blade 18 being supported in a cradle or guide 60. In this example, the cradle 60 supports the main blade module 20 when the main blade and separate edge modules 20, 22 are being bonded, as will be described below. In particular, instead of applying a pressure force by inflating one or more airbags as in the above-described example, in the example described below a deformable bag encapsulates the tongue 28 and recess 30 (not shown in FIGS. 7(*a*) and 7(*b*)) to form an air sealed region that includes the tongue and recess. Air is then removed from the sealed region to create a vacuum therein, which causes a pressure force that squeezes the tongue and recess together. Such an approach is a particularly simple and inexpensive way to provide an air pressure force to cause bonding of the mating features, and needs minimum tooling.

In the described example, the cradle 60 is formed by separate cradle components spaced apart and arranged and shaped to receive the main blade module 20 therein. In particular, the main blade module 20 is positioned in the cradle 60 so that its tongue 28 extends in a generally upwards direction. Specifically, a side of each cradle 60 includes a hinge 61 that allows the cradle 60 to be opened up to receive the main blade module 20 therein.

The separate edge modules 22 may then be placed on the main blade module 20 to complete the aerodynamic profile (as shown in FIGS. 7(*a*) and 7(*b*)). The tongue 28 and recess 30 (not shown in FIGS. 7(*a*) and 7(*b*)) of the main blade and separate edge modules 20, 22, respectively, are shaped such that the separate edge module 22 self-locates on the main blade module 20 when placed thereon. The cradle 60 is also shaped to support the separate edge module 22 in its self-locating position when placed on the main blade module 20. Once the main blade module 20 and separate edge module 22 are in place, the cradle 60 is closed back up to verify the shape of the blade 18.

The cradle 60 includes a datum reference, e.g. in the form of a cable, bar or laser projection between each of the separate cradle components, which indicates how far the separate edge module 22 is to be lowered when being placed on the main blade module 20.

The separate components of the cradle 60 may equally be connected together by further components therebetween. In addition, the cradle 60 may include a platform or walkway to allow an operator to access the separate edge modules 22 when they are placed on the main blade module 20.

Figure 7A:
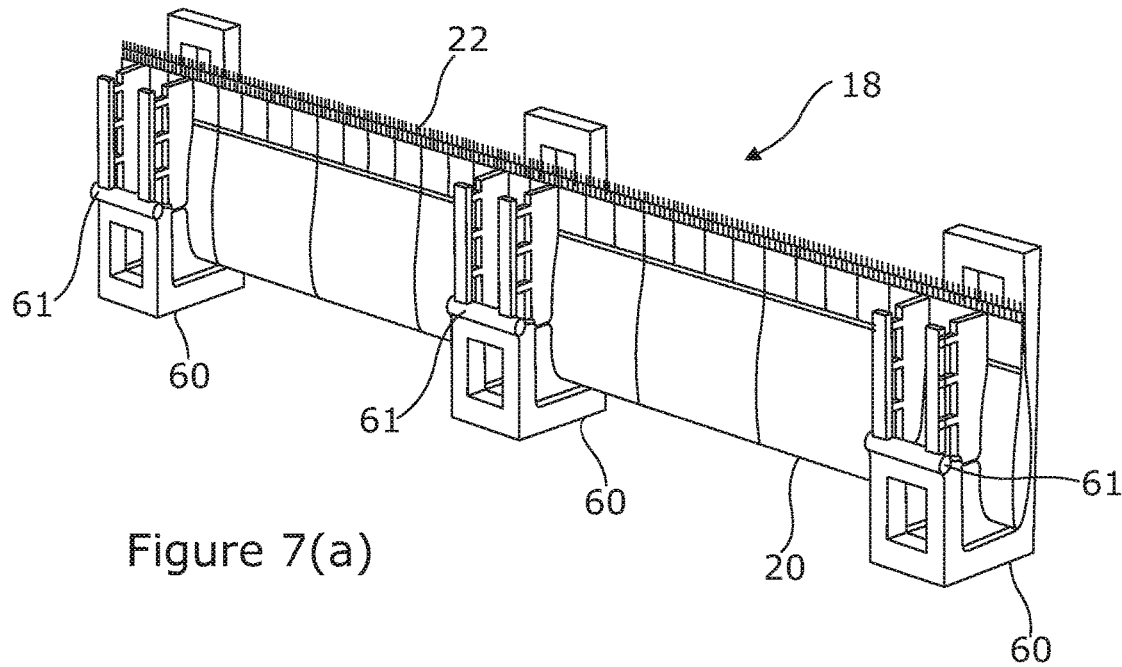
FIGS. 7(a) and 7(b) show schematic views of a cradle supporting a plurality of the main blade modules and a plurality of the separate edge modules of FIG. 2, where the main blade modules and separate edge modules are arranged to be mutually adjacent.
Figure 7B:
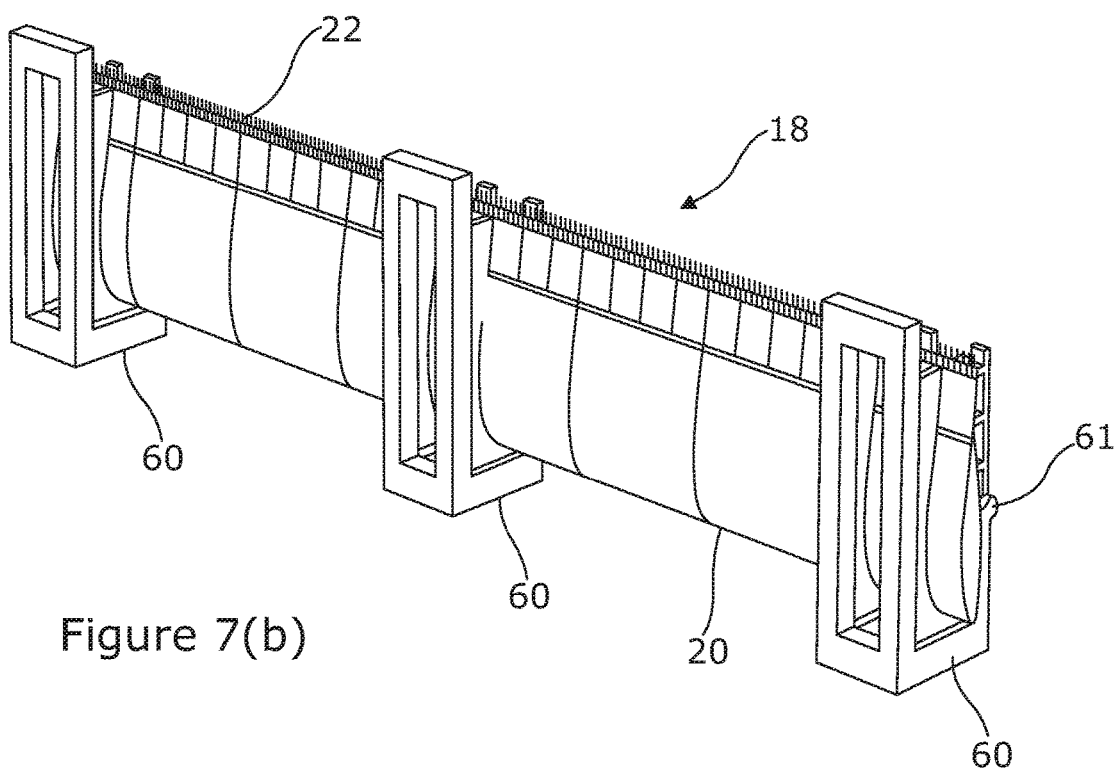

Prior to placing the separate edge module 22 on the main blade module 20, and similarly to the above-described example, a layer of adhesive is applied to the surface of the tongue 28 and/or the recess 30 (not shown in FIGS. 7(a) and 7(b)), to be used to bond the modules 20, 22 together.

Figure 8:
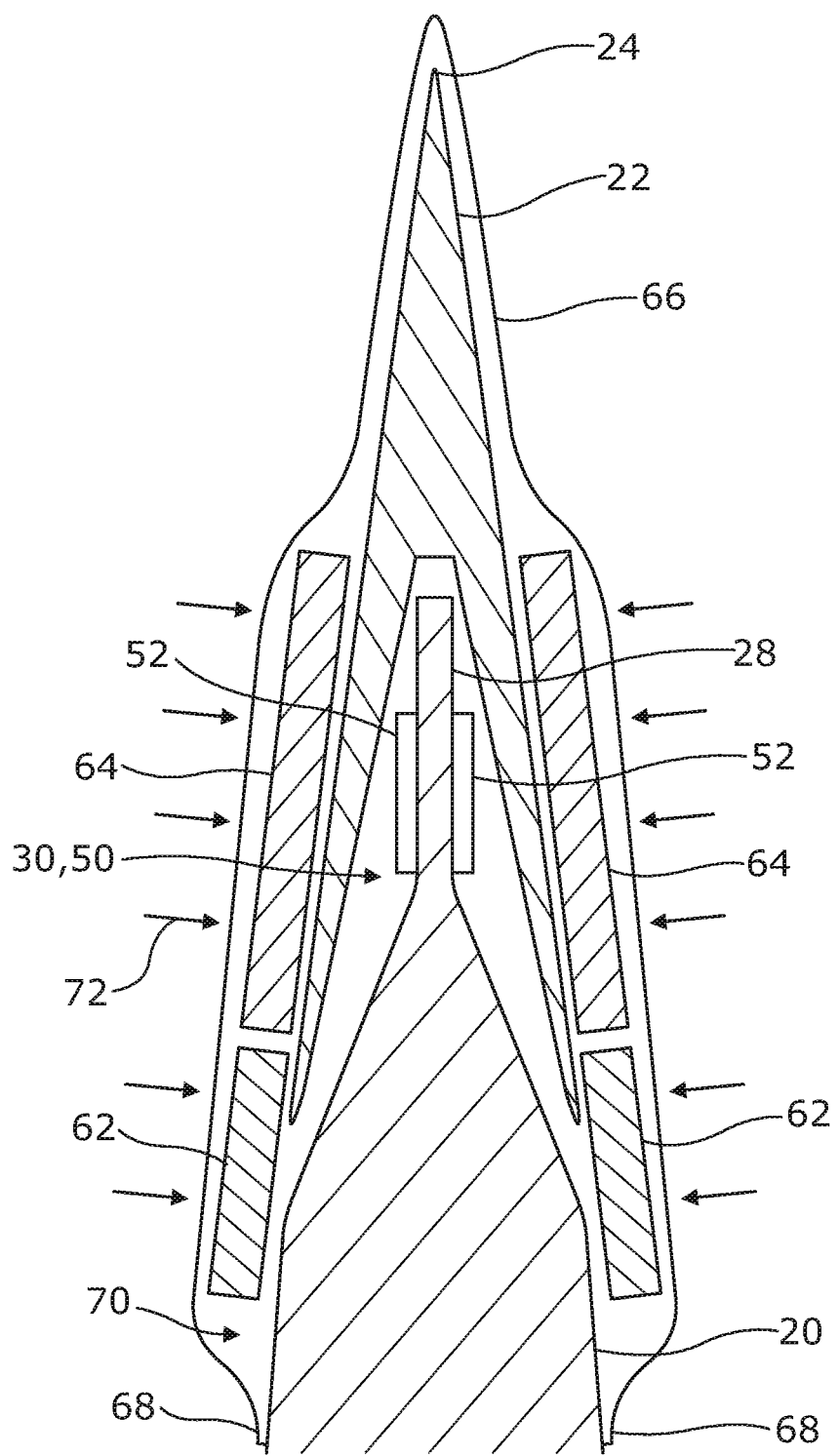
FIG. 8 shows a schematic sectional view of the main blade module and separate edge module encapsulated by a deformable vacuum bag; and, FIG. 9 shows the steps of a manufacturing method to form the wind turbine blade(s) of FIG. 1 from the main blade module and separate edge module of FIG. 2(b).

With additional reference to FIG. 8, a method of bonding the main blade module 20 and separate edge module 22 together is now described when the modules 20, 22 are positioned in the cradle 60 such that the tongue 28 and recess 30 are mutually adjacent. FIG. 8 shows a schematic sectional view of the main blade module 20 positioned in the cradle (not shown) so that the tongue 28 extends in a generally upwards direction. The separate edge module 22 is placed on the main blade module 22 so that the tongue 28 is received in the recess 30. FIG. 8 also shows the presence of the gap 50 when the tongue 28 and recess 30 are mutually adjacent, but prior to them being bonded together by means of the adhesive layer.

In the described example, a consolidator 62 may optionally be placed at the interface between the main blade module 20 and the separate edge module 22 at the outer surface of the blade 18. That is, the consolidator 62 is placed in the region of the opening of the gap 50 at the blade surface. The consolidator 62 is in the form of strips that overlap the interface between the modules 20, 22 at the blade surface. In the described example, the consolidator strips 62 may be formed from plywood covered with polytetrafluoroethylene (PTFE), e.g. Teflon. The consolidator strips 62 aim to ensure that the separate edge module 22 is flush with the main blade module 20 at the interface when a force is applied to bond the modules 20, 22 together. The provision of the consolidator 62 helps to guard against the formation of a step or ridge at the interface between the modules 20, 22, the presence of which at the surface of the blade 18 would be a source or noise and/or turbulence when the blade 18 is in operation. The consolidator 62 can also assist in guarding against the adhesive 52 flowing out of the interface during the bonding process.

In the described example, a pressure distributor 64 may optionally be placed against the outer surface of the separate edge module 22. In particular, the pressure distributor 64 is located adjacent the recess 30 of the separate edge module 22. In the described example, the pressure distributor 64 is in the form of a layer of perforated hardboard, e.g. pegboard, covered by a layer of mesh formed by connected strands of metal, fibres, or any other suitable flexible material. The pressure distributor acts to distribute the force that is applied to join the main blade and separate edge modules 20, 22 together, in particular to distribute the force applied to the separate edge module 22 adjacent to the recess 30. Advantageously, the provision of such a distributor 64 may distribute the applied force across the outer surface of the blade 18, or a particular region thereof, to ensure the force is applied in an even manner and so provide an even bond between the modules 20, 22.

With the consolidator 62 and pressure distributor 64 in place, a deformable vacuum bag 66 is then placed around the arrangement. In particular, the vacuum bag 66 encapsulates the separate edge module 22 and part of the main blade module 20 including the tongue 28. The vacuum bag 66 is sealed by attaching it to the surface of the main blade module 20 along a sealing line or at sealing points 68. Note that the consolidator 62 and pressure distributor 64 are therefore also encapsulated by the vacuum bag 66. Although in the described example the vacuum bag 66 encapsulates the entire separate edge module 22 including the trailing edge 24, in different examples the vacuum bag 66 may encapsulate the recess 30, but not the trailing edge 24, of the edge module 22, and have sealing points attached to the surface of the separate edge module 22.

A tube (not shown) or other means for removing air is provided to draw air out from the air sealed region 70 defined by the vacuum bag 66. In particular, the tube is used to remove air from the sealed region 70 to create a vacuum in the sealed region 70. This results in the pressure in the sealed region being lower than outside of the sealed region, and this difference in pressure causes a pressure force to be applied. The arrows 72 in FIG. 8 indicate schematically the direction of the force caused by the pressure difference. Specifically, the pressure force causes the tongue 28 and recess 30 to be forced together thereby closing the gap 50. In turn, the adhesive layer on the tongue 28 and/or recess 30 is therefore squeezed, causing the main blade and separate edge modules 20, 22 to be bonded together.

As mentioned above, when the pressure force is applied the consolidator 62 acts to ensure that the main blade and separate edge modules 20, 22 are bonded in such a manner that the interface between these modules 20, 22 at the surface of the blade 18 is flush. The consolidator 62 also acts to ensure that the adhesive does not spew or flow out at the surface of the blade 18 in a manner that would result in a ridge or step at the blade surface.

In order to protect the trailing edge 24, in particular the serrations 26 (not shown in FIG. 8), from being damaged when the vacuum pressure force is applied, a protective cover or shield (not shown) may be provided to cover the end of the separate edge module 22 that defines the trailing edge 24 prior to forming the air sealed region 70 with the vacuum bag 66. In particular, the protective cover may be in the form of a material which guards against the vacuum bag 66 pressing against, damaging and/or crushing the serrations 26 when air is removed from the sealed region 70 to cause the vacuum.

Figure 9:
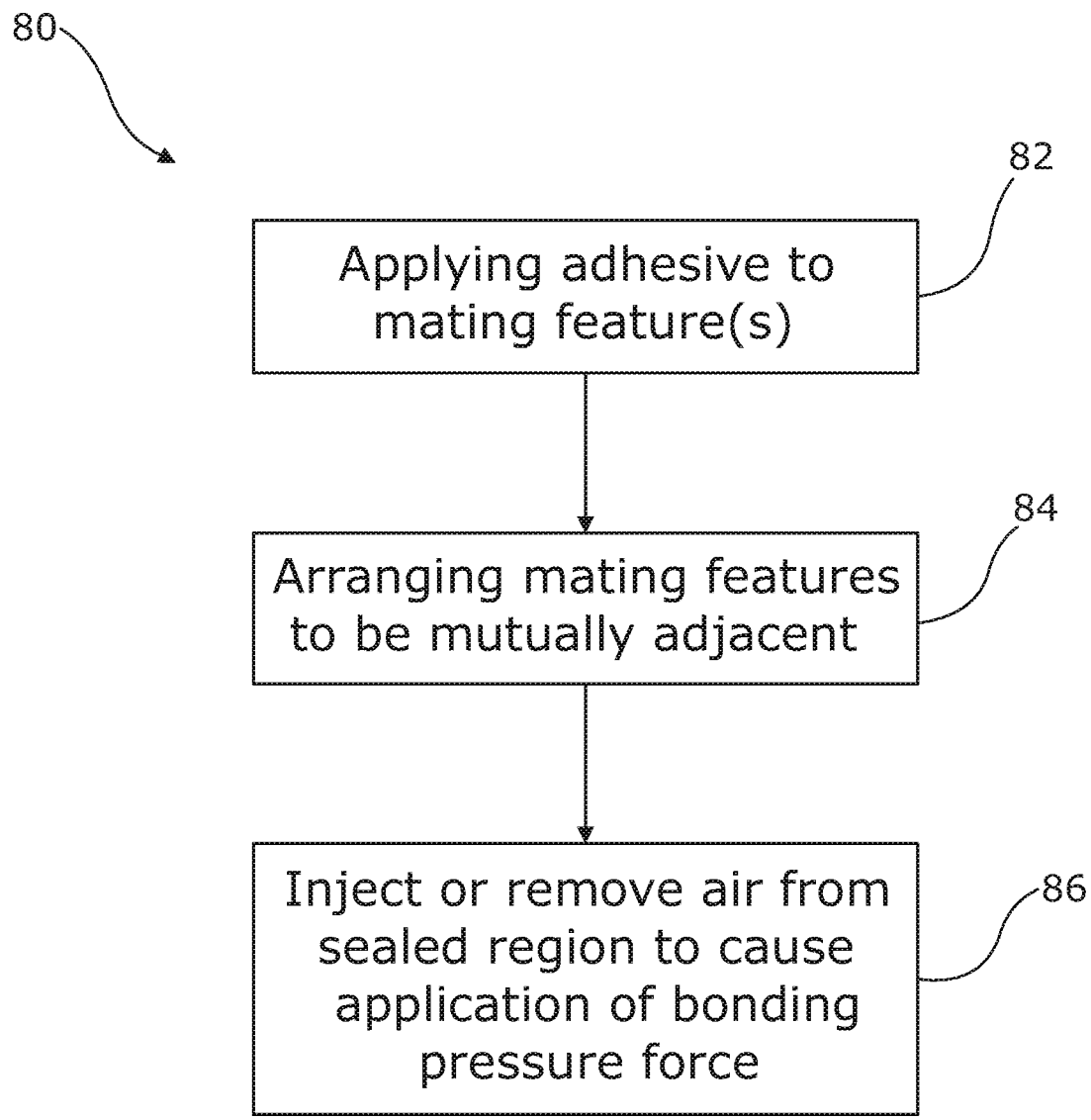

FIG. 9 summarises steps of the method 80 performed to form the wind turbine blade 18 in the above-described example. At step 82 an adhesive is applied to either or both of the mating features, i.e. the tongue 28 and recess 30, of the main blade and separate edge modules 28, 30. At step 84 the main blade and separate edge modules 20, 22 are arranged relative to each other so that the mating features 28, 30 are mutually adjacent. In the example shown in FIGS. 4-6, this step involves clamping the separate edge module 22 using the clamping airbags 38 and lowering the frame 34 and clamped edge module 22 onto the upwardly-facing main blade module 20. In the example shown in FIGS. 7-8, this step involves positioning the main blade module 20 in the cradle 60 and placing the self-locating edge module 22 on the main blade module 20. At step 86 a pressure force is applied to squeeze the adhesive 52 to bond the first and second mating features 28, 30 together. In the example shown in FIGS. 4-6, the pressure force is caused by injecting air into the bonding airbags 48 whose surface then presses on the surface of the separate edge module 22 to press the mating features 28, 30 together. In the example shown in FIGS. 7-8, the pressure force is caused by removing air from the sealed region 70 to create a vacuum which results in the mating features 28, 30 being forced together.

In each of the described examples, a pressure force is applied to squeeze the adhesive to bond mating features together, in particular by removing air from, or injecting air into, an air sealed region. Application of a force that is caused by a change of air pressure is advantageous for the bonding process because it facilitates force being applied to parts having complex geometry, e.g. a curved surface such as that of the aerofoil profile of a rotor blade, and being formed of delicate, lightweight materials. In particular, application of an air pressure force to a localised region may be advantageous compared with application of force caused by, for example, a solid part pressing against the main blade and/or separate edge module in that such a solid part is unlikely to conform to the shape of the surface of the complex-shaped modules, potentially causing uneven application of the force and therefore a sub-optimal bond between the modules. Also, such a solid part is unlikely to provide a flexible application of force, thus increasing the risk of causing damage to the modules during the bonding process.

Many modifications may be made to the above-described examples without departing from the scope of the present invention as defined in the accompanying claims.

In the above-described example, the separate edge modules include serrations at the trailing edge. In different examples, however, the separate edge modules may additionally or alternatively include different features for controlling or disrupting the flow at the trailing edge, e.g. vortex generators. Indeed, in certain examples the separate edge modules may simply define the trailing edge of the rotor blade without any features such as serrations.

In the above-described examples, the mating features of the main blade and separate edge modules are a tongue and recess, respectively. In different examples, however, the main blade module may instead have a recess and the separate edge module may instead have a tongue. Indeed, in further different examples the mating features need not be in the form of a tongue and recess, and any suitable mating features for joining the modules together may be used.

The pressure distributor and consolidator are described above in connection with the example in which the vacuum is used to bond the main blade and separate edge modules together. Note, however, that one or both of the pressure distributor and consolidator may also be used in connection with the other example that uses the bonding airbags to bond the modules together.

The vent holes are described above in connection with the example in which the bonding airbags are used to bond the modules together; however these may also be present in the above-described vacuum bag example. In both of these example, any adhesive that spews out from the vent holes during the bonding process may be removed, e.g. using a knife, to ensure the outer surface of the rotor blade is smooth.

The invention claimed is:

1. A method of forming a wind turbine blade, the wind turbine blade comprising:
   a main blade module defining a main body of the blade and including a first mating feature; and,
   a separate edge module defining at least part of a trailing edge of the blade and including a second mating feature,
   the method comprising:
   applying an adhesive to at least one of the first mating feature and the second mating feature;
   arranging the separate edge module relative to the main blade module such that the first and second mating features are mutually adjacent; and,
   applying a pressure force to squeeze the adhesive to bond the first and second mating features together,
   wherein the pressure force is caused by removing air from, or injecting air into, an air sealed region.

2. The method according to claim 1, wherein the method comprises locating a pressure distributor against the separate edge module to distribute the pressure force that is applied to the first and second mating features.

3. The method according to claim 1, wherein the method comprises providing a consolidator at an interface between the main blade module and the separate edge module at an outer surface of the blade, the consolidator being arranged to ensure that the separate edge module is flush with the main blade module at the interface when the pressure force is applied.

4. The method according to claim 1, wherein the first mating feature is a tongue and the second mating feature is a recess complementary to the tongue, and wherein arranging the separate edge module relative to the main blade module includes receiving the tongue into the recess.

5. The method according to claim 4, wherein the separate edge module comprises at least one vent hole extending between the recess and an outer surface of the separate edge module, and wherein squeezing the adhesive causes the adhesive to flow through the at least one vent hole.

6. The method according to claim 4, wherein arranging the separate edge module relative to the main blade module comprises:
   positioning the main blade module so that the tongue extends in a generally upwards direction; and,
   placing the separate edge module on the main blade module,
   wherein the tongue and the recess are shaped so that the separate edge module self-locates relative to the main blade module when placed thereon.

7. The method according to claim 1, wherein arranging the separate edge module relative to the main blade module comprises:
   positioning the main blade module so that the first mating feature extends in a generally upwards direction;
   clamping the separate edge module in a clamp;
   positioning the clamped separate edge module generally above the main blade module; and,
   lowering the separate edge module onto the main blade module and using an alignment device to maintain alignment between the main blade module and the separate edge module when arranging the first and second mating features to be mutually adjacent, the alignment device being coupled to the clamp.

8. The method according to claim 7, wherein the alignment device comprises a plurality of alignment rollers that roll against an outer surface of the main blade module as the separate edge module is lowered to maintain alignment of the separate edge module with the main blade module.

9. A wind turbine blade, comprising:
   a main blade module defining a main body of the blade and including a first mating feature; and,
   at least one separate edge module defining at least part of a trailing edge of the blade and each including a second mating feature,
   wherein the wind turbine blade is formed according to the method of claim 1.

10. The method according to claim 1, wherein forming of the wind turbine blade is when the wind turbine blade is uninstalled from a wind turbine.

11. The method according to claim 1, wherein the main blade module is formed having the first mating feature.

12. A method of forming a wind turbine blade, the wind turbine blade comprising:
   a main blade module defining a main body of the blade and including a first mating feature; and, a separate edge module defining at least part of a trailing edge of the blade and including a second mating feature, the method comprising:

applying an adhesive to at least one of the first mating feature and the second mating feature;

arranging the separate edge module relative to the main blade module such that the first and second mating features are mutually adjacent; and, applying a pressure force to squeeze the adhesive to bond the first and second mating features together, wherein the pressure force is caused by removing air from, or injecting air into, an air sealed region; and, wherein the air sealed region encapsulates at least the first and second mating features, the method comprising forming the air sealed region after the separate edge module has been arranged relative to the main body module, and the method comprising removing air from the sealed region to create a vacuum and cause the pressure force to be applied.

13. The method according to claim 12, wherein the air sealed region is defined by a deformable vacuum bag.

14. The method according to claim 12, wherein the method comprises providing an end of the separate edge module that defines the at least part of the trailing edge with a protective cover prior to forming the air sealed region.

15. A method of forming a wind turbine blade, the wind turbine blade comprising:

a main blade module defining a main body of the blade and including a first mating feature; and, a separate edge module defining at least part of a trailing edge of the blade and including a second mating feature, the method comprising:

applying an adhesive to at least one of the first mating feature and the second mating feature;

arranging the separate edge module relative to the main blade module such that the first and second mating features are mutually adjacent; and, applying a pressure force to squeeze the adhesive to bond the first and second mating features together, wherein the pressure force is caused by removing air from, or injecting air into, an air sealed region; and, wherein the air sealed region is defined by one or more inflatable airbags, and the method comprises injecting air into the one or more inflatable airbags to cause the force to be applied by the inflatable airbags applying pressure to an outer surface of the blade in the vicinity of the first and second mating features.

16. The method according to claim 15, wherein the pressure force applied to the outer surface is applied progressively in a chordwise direction of the blade towards the trailing edge of the blade.

17. The method according to claim 15, wherein the method comprises injecting the one or more inflatable airbags with air at a temperature greater than ambient temperature.

* * * * *